United States Patent
Kang et al.

(10) Patent No.: US 11,814,711 B2
(45) Date of Patent: Nov. 14, 2023

(54) SYSTEM AND METHOD FOR APPLYING HIGH TEMPERATURE CORROSION RESISTANT AMORPHOUS BASED COATINGS

(71) Applicant: CORNERSTONE INTELLECTUAL PROPERTY, LLC, Lake Forest, CA (US)

(72) Inventors: John Kang, Lake Forest, CA (US); Evelina Vogli, Lake Forest, CA (US); Ricardo Salas, Lake Forest, CA (US)

(73) Assignee: LIQUIDMETAL COATINGS ENTERPRISES, LLC., Chattanooga, TN (US)

( * ) Notice: Subject to any disclaimer, the term of this patent is extended or adjusted under 35 U.S.C. 154(b) by 0 days.

(21) Appl. No.: 16/731,609

(22) Filed: Dec. 31, 2019

(65) Prior Publication Data
US 2021/0198777 A1 Jul. 1, 2021

(51) Int. Cl.
*C22C 45/04* (2006.01)
*C23C 4/12* (2016.01)
(Continued)

(52) U.S. Cl.
CPC .............. *C22C 45/04* (2013.01); *C04B 35/56* (2013.01); *C04B 35/5805* (2013.01); *C04B 35/62222* (2013.01); *C04B 35/65* (2013.01); *C22C 32/0047* (2013.01); *C23C 4/08* (2013.01); *C23C 4/12* (2013.01); *C23C 4/18* (2013.01); *C04B 2235/3804* (2013.01);
(Continued)

(58) Field of Classification Search
None
See application file for complete search history.

(56) References Cited

U.S. PATENT DOCUMENTS 4,770,701 A * 9/1988 Henderson .............. B22F 3/007
75/232
5,866,254 A * 2/1999 Peker .................... B22D 19/14
428/378
(Continued)

FOREIGN PATENT DOCUMENTS

CN 101235471 A * 8/2008
CN 110241352 A * 9/2019

OTHER PUBLICATIONS

English Translation of CN 110241352 (originally published Sep. 17, 2019), obtained from Espacenet.*
English translation of CN 101235471 (originally published Aug. 6, 2008) obtaned from PE2E search.*

*Primary Examiner* — George Wyszomierski
(74) *Attorney, Agent, or Firm* — Dave Law Group LLC; Raj S. Dave

(57) ABSTRACT

An embodiment relates to a material comprising a ceramic formed from an amorphous metal alloy (amorphous metal ceramic composite), wherein the composite exhibits a higher corrosion resistance than that of Haynes 230 when exposed to molten chlorides such as KCl or $MgCl_2$ or combinations thereof at temperatures up to 750° C. Yet, another embodiment relates to a method comprising obtaining a substrate, forming a coating of an amorphous metal alloy, heating the coating, and transforming at least a portion the amorphous metal alloy into an amorphous metalceramic composite.

20 Claims, 7 Drawing Sheets

(51) Int. Cl.
*C23C 4/08* (2016.01)
*C23C 4/18* (2006.01)
*C04B 35/58* (2006.01)
*C04B 35/56* (2006.01)
*C04B 35/65* (2006.01)
*C04B 35/622* (2006.01)
*C22C 32/00* (2006.01)
C23C 4/129 (2016.01)

(52) U.S. Cl.
CPC *C04B 2235/3817* (2013.01); *C04B 2235/405* (2013.01); *C04B 2235/9669* (2013.01); *C23C 4/129* (2016.01)

(56) References Cited

U.S. PATENT DOCUMENTS

| | | | |
|---|---|---|---|
| 2007/0144621 A1* | 6/2007 | Farmer | C23C 4/06 148/403 |
| 2007/0153965 A1* | 7/2007 | Choi | C23C 4/18 376/417 |
| 2009/0025834 A1* | 1/2009 | Poon | C22C 33/0228 148/403 |
| 2009/0114317 A1* | 5/2009 | Collier | G02B 5/0808 148/403 |
| 2017/0312817 A1* | 11/2017 | Gong | C22C 1/05 |
| 2020/0199722 A1* | 6/2020 | Chou | C22C 33/0285 |
| 2021/0317552 A1* | 10/2021 | Kim | B33Y 80/00 |

* cited by examiner

SYSTEM AND METHOD FOR APPLYING HIGH TEMPERATURE CORROSION RESISTANT AMORPHOUS BASED COATINGS

FIELD OF THE INVENTION

This invention relates to the application of amorphous based coatings to prevent corrosion against molten salt on applied surfaces; more particularly, amorphous based coatings compositions are disclosed, where application of the coating to a material provides corrosion resistance against molten salt in a superior fashion to the products currently used to prevent corrosion resistance against molten salt.

BACKGROUND OF INVENTION

Compared to metallic alloy materials with a crystalline microstructure, "[i]t is widely known that metallic glasses are solid alloys [that] [exhibit] many superior properties", where "[t]he unique properties [of metallic glasses] originate from [their] random atomic arrangement . . . that contrasts with the regular atomic lattice arrangement found in crystalline alloys." [Source: "Classification of Bulk Metallic Glasses by Atomic Size Difference, Heat of Mixing and Period of Constituent Elements and Its Application to Characterization of the Main Alloying Element"; Takeuchi, A.; Inoue, A.; Materials Transactions, Vol. 46, No. 12 (2005) pp. 2817 to 2829].

"The mechanical properties of amorphous alloys have proven both scientifically unique and of potential practical interest, although the underlying deformation physics of these materials remain less firmly established as compared with crystalline alloys." [Source: Mechanical behavior of amorphous alloys"; Schuh, C.; Hufnagel, T.; Ramamurty, U.; Acta Materialia 55 (2007) 4067 4109]. Further, "[t]he mechanics of metallic glasses have proven to be of fundamental scientific interest for their contrast with conventional crystalline metals, and also occupy a unique niche compared with other classes of engineering materials. For example, amorphous alloys generally exhibit elastic moduli on the same order as conventional engineering metals . . . but have room-temperature strengths significantly in excess of those of polycrystals with comparable composition. The consequent promise of high strength with non-negligible toughness has inspired substantial research effort on the room-temperature properties of metallic glasses." [Source: Mechanical behavior of amorphous alloys"; Schuh, C.; Hufnagel, T.; Ramamurty, U.; Acta Materialia 55 (2007) 4067 4109].

One of the areas in which much research has been conducted is in the ability of amorphous alloys to demonstrate corrosion resistance. "A number of amorphous metals exhibit excellent corrosion resistance, which has been explained in terms of their structural homogeneity. Since amorphous metals are in principle structurally and chemically homogeneous and thus lack any microstructure, such as grain boundaries, which could act as local electrochemically-active sites, many researchers attribute good corrosion resistance to the entire class of amorphous metals." [Schroeder, Valeska et al. "Comparison of the corrosion behavior of a bulk amorphous metal, $Zr_{41.2}Ti_{13.8}Cu_{12.5}Ni_{10}Be_{22.5}$, with its crystallized form." (1998).]. It is established that amorphous metals have good corrosion resistance, and their properties have been called upon for use in many applications which require corrosion resistance.

Corrosion resistance is required in many industries. Specifically, there is a need for corrosion resistance against molten salt. Industries which require protection against corrosion resulting from molten salt exposure include the power industry, desalination industry, chemical, oil and gas, power generation industry, and aerospace industry. In the power industry, corrosion resistance against molten salts is needed for concentrated solar power, molten salt batteries, and thermal batteries used extensively in military applications, especially for guided missiles, as a power source. In desalination, the resistance is needed for pumps, compressors, heat exchangers, and valves. For the chemical industry, corrosion restrained against molten salts is required for nozzles, castings, valves, and pumps. In the oil and gas industry, resistance against molten salt is needed for impellers, centralizers, and inserts. In the power generation industry, resistance against molten salt corrosion is needed for heat shields, boiler tubes, seals, and shields. Lastly, in the aerospace industry, corrosion resistance against molten salts is needed for turbine blades, compressors, nozzles, gears, and chambers. Current products available in the market do not provide full protection against corrosion due to molten salt exposure and have a lackluster performance. One of the premier products currently available, the Haynes 230 alloy, still allows for a corrosion of 0.67 millimeters per year. Current products available on the market offer only lackluster performance.

The ultimate tensile strength of all Ni-based alloys reduces rapidly after 600° C. Cho et al. studied and modelled the corrosion resistance of Fe—Ni—Cr alloy under KCl—$MgCl_2$ at a temperature range of 700° C. to 1,000° C. The experiment results and the model predictions showed that the selective Cr corrosion is mass transfer driven and the depletion could be further increased in CSP systems with forced convection. Several coatings including iron- and nickel-based alloys, nickel electroplating, molybdenum thermal spray, and diamond like coatings and post-processing techniques were investigated at University of Wisconsin-Madison. They showed that Ni-electroplated coatings were the most promising, while Mo thermal spray and diamond like carbon coatings had spalling issues. The Ni-plating was shown to greatly reduce the rate of corrosion due to chromium dealloying from the base alloy.

In "High-efficiency concentrated solar power plants need appropriate materials for high-temperature heat capture, conveying and storage" published in *Energy*, Volume 139, 15 Nov. 2017, Pages 52-64, Zhang et al. state: "Temperatures of 600-900° C. foster the use of high-efficiency power generation cycles." Researchers are looking for high temperature corrosion resistant coatings because at above 600° C. the efficiency of concentrated solar power plants are high and the electricity costs ($/kWh) are drastically reduced.

To operate concentrated solar power plants at above 700° C., the concentrated solar power plants need to use molten salts like chloride salts for both heat transfer and thermal energy storage. Currently, the concentrated solar power plants use nickel-based alloys, which are extremely expensive. Typically, the nickel-based alloy are Haynes alloys, which too are not able to provide the corrosion resistance of 15 micrometer/year or less at above 700° C.

Accordingly, it would be desirable to develop an amorphous metal coating having a unique composition such that the amorphous metal is capable of providing full corrosion resistance to a material it is coated to against molten salts. This would improve the performance of many industries in which molten salts are used.

An embodiment relates to a material comprising a composite comprising an amorphous metal ceramic composite formed from an amorphous metal alloy, wherein the composite exhibits a higher corrosion resistance than that of Haynes 230 when exposed to molten KCl or $MgCl_2$ or combinations thereof at a temperature up to 750° C.

In an embodiment, the composite exhibits no corrosion when exposed to the molten KCl or $MgCl_2$ or combinations thereof at the temperature up to 750° C.

In an embodiment, the composite is formed from the amorphous metal alloy within 300 hours by exposing the amorphous metal alloy to a temperature above 650° C. In an embodiment, the composite is not fully amorphous or at least partially crystalline. In an embodiment, the composite comprises a boride and a carbide. In an embodiment, the material is configured to be a component of a solar concentrator. In an embodiment, the composite exhibits substantially no corrosion when exposed to the molten KCl or $MgCl_2$ for at least 30 years. In an embodiment, the amorphous metal alloy is partially or fully amorphous. In an embodiment, the amorphous metal alloy comprises a nickel based alloy and/or an iron based alloy. In an embodiment, the composite comprises a coating.

Another embodiment relates to a method comprising obtaining a substrate, forming a coating of an amorphous metal alloy, heating the coating, and transforming at least a portion the amorphous metal alloy into a composite comprising an amorphous metal ceramic composite. In an embodiment, the forming the coating comprises thermally and/or non-thermally spraying the amorphous metal alloy.

In an embodiment, the composite exhibits a higher corrosion resistance than that of Haynes 230 when exposed to molten KCl or $MgCl_2$ or combinations thereof at a temperature at 750° C. for a period of 300 hours. In an embodiment, the composite exhibits no corrosion when exposed to molten KCl or $MgCl_2$ or combinations thereof at a temperature at 750° C. for a period of at least 300 hours. In an embodiment, the composite is formed from the amorphous metal alloy within 300 hours by exposing the amorphous metal alloy to a temperature above 600° C. In an embodiment, the composite is not fully amorphous or at least partially crystalline. In an embodiment, the composite comprises a boride and a carbide. In an embodiment, the composite exhibits substantially no corrosion when exposed to the molten KCl or $MgCl_2$ or combinations thereof at a temperature up to 750° C. for at least 30 years. In an embodiment, the amorphous metal alloy is partially or fully amorphous. In an embodiment, the amorphous metal alloy comprises a nickel based alloy and/or an iron based alloy. An embodiment relates to a composition comprising an amorphous nickel-based alloy.

Additional embodiments relates to a composition, wherein the amorphous alloy comprises Ni, Fe, Cr, X, and Y, wherein: X and Y are elements, and X is selected from the group consisting molybdenum, copper, cobalt, aluminum, titanium, tungsten, niobium, silicon, vanadium, and combinations thereof, and the Y is selected from the group consisting of boron, carbon, silicon, and combinations thereof. The composition, where the amorphous alloy comprises $Ni_{100-(a+b+c+d)}(Cr_aX_bY_c)$, wherein: a is in the range of 10 to 50 wt %; b is under 30 wt %, and c is in the range of 0 to 10 wt %. The composition, where the amorphous alloy comprises $Ni_{100-(a+b+c+d)}(Cr_aX_bY_c)$, wherein: a is in the range of 10 to 50 wt %; b is in the range of 10-30 wt %, and c is in the range of 0 to 10 wt %. The composition, wherein the amorphous alloy comprises $Fe_{100-(a+b+c+d)}(Cr_aX_bY_c)$, wherein: a is in the range of 15 to 40 wt. %; b is in the range of 10 to 30 wt. % and c is under 10 wt %.

Additional embodiments relates to a method comprising depositing a molten amorphous feedstock to form a first amorphous layer comprising a composition, wherein the molten amorphous feedstock comprises:

$Ni_{100(a+b+c+d)}(Cr_aX_bY_c)$, wherein: a is in the range of 10 to 50 wt %; b is under 30 wt %, and c is in the range of 0 to 10 wt %. or $Ni_{100(a+b+c+d)}(Cr_aX_bY_c)$, wherein: a is in the range of 10 to 50 wt %; b is in the range of 10 to 30 wt %, and c is in the range of 0 to 10 wt %.

or $Fe_{100(a+b+c+d)}(Cr_aX_bY_c)$, wherein: a is in the range of 15 to 40 wt. %; b is in the range of 10 to 30 wt. % and c is under 10 wt %. The method, wherein the depositing the molten amorphous feedstock comprises thermal spray coating, which encompasses high velocity oxygen fuel, plasma spraying, and/or arc spraying. The method, wherein the first amorphous layer and the second amorphous layer are deposited on a substrate wherein an outermost surface layer of the substrate is phase-transformed such that the outermost surface layer comprises an amorphous material and at least a portion of the substrate comprises a partially crystalline material or a fully crystalline material beneath the outermost surface layer.

Another embodiment relates to a method comprising: metallic, ceramic, cermet, and some polymeric materials in the form of powder, wire, or rod are fed to a torch or gun with which they are heated to near or somewhat above their melting point. The resulting molten or nearly molten droplets of material are accelerated in a gas stream and projected against the surface to be coated.

BRIEF DESCRIPTION OF THE FIGURES

These and other features and advantages of the present invention will be better understood by reference to the following detailed description when considered in conjunction with the accompanying drawings wherein.

DETAILED DESCRIPTION

Definitions and General Techniques

All publications, patents, and patent applications cited in this Specification are hereby incorporated by reference in their entirety. The singular forms "a," "an" and "the" are used herein to refer to one or more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties, e.g., physical properties, than their crystalline counterparts. However, if the cooling rate is not sufficiently high, crystals may form inside the alloy during cooling, so that the unique benefits of the amorphous state can be lost. For example, one challenge with the fabrication of bulk amorphous alloy parts is the partial crystallization of parts due to either slow cooling or impurities prevalent in the raw alloy material. As a high degree of amorphicity (and, conversely, a low degree of crystallinity) is desirable in BMG parts, there is a need to develop methods for casting BMG parts having predictable and controlled amount of amorphicity.

Figure 1:
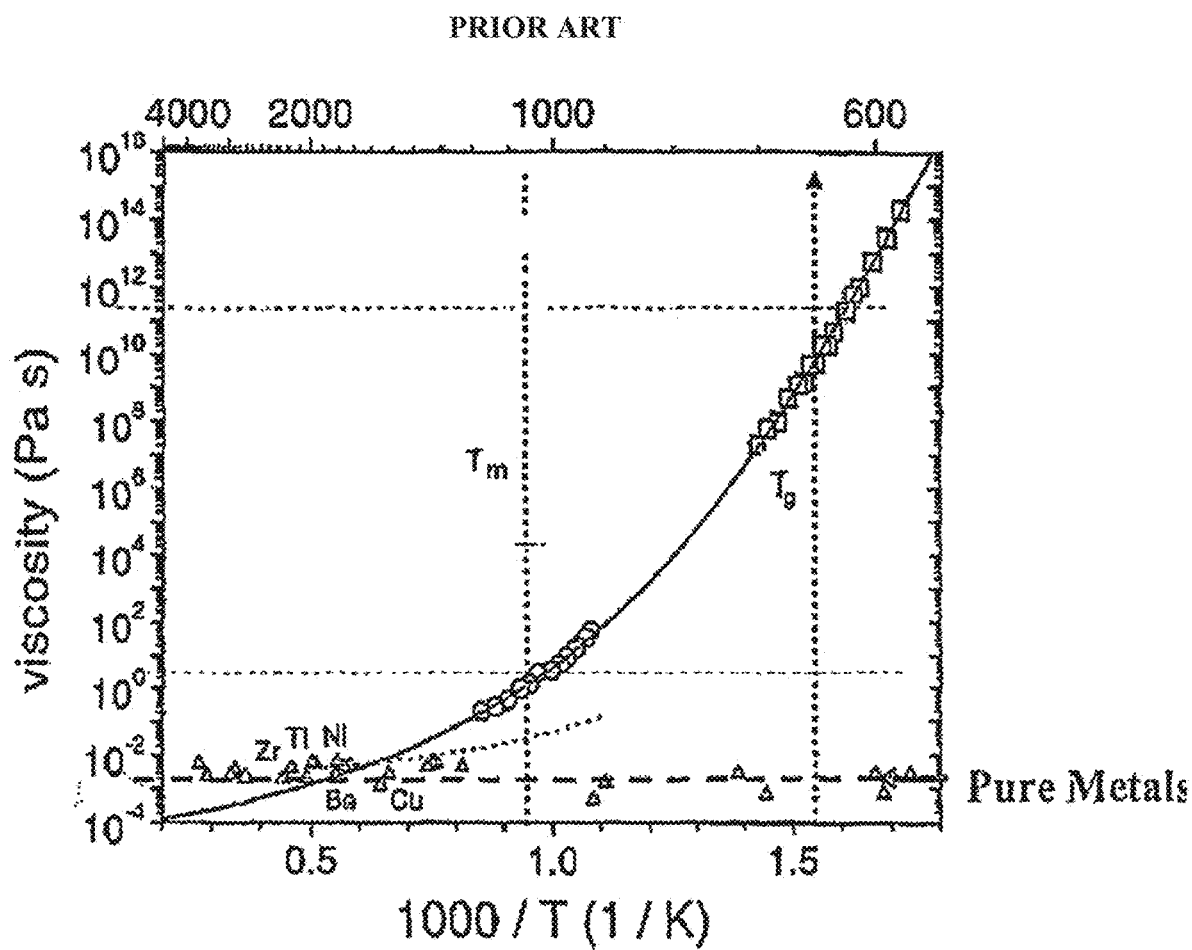
FIG. 1 shows a schematic Time-Temperature-Transformation (TTT) diagram that shows crystallization kinetics amorphous metals vs. crystalline metals.

FIG. 1 (obtained from U.S. Pat. No. 7,575,040) shows a viscosity-temperature graph of a bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
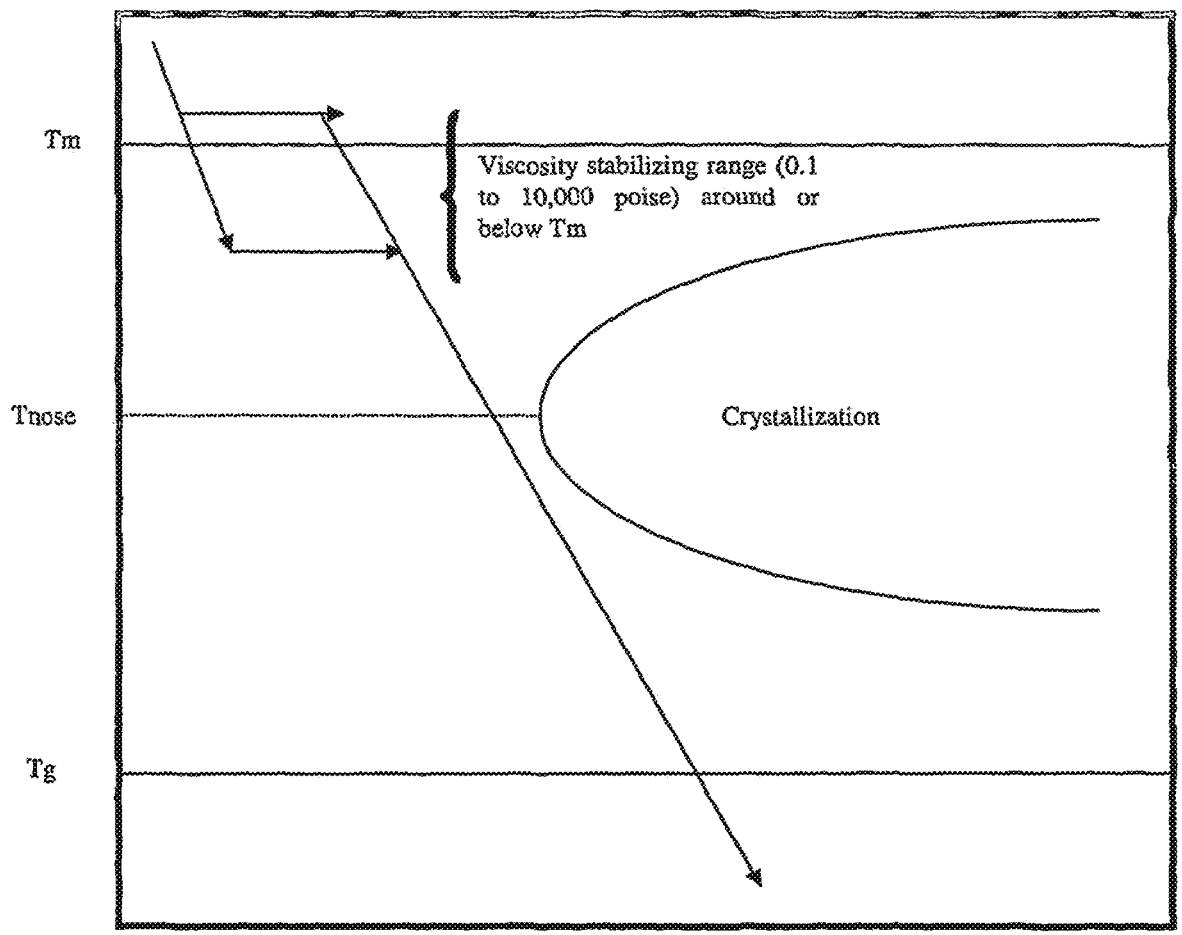
FIG. 2 shows an Ashby map of the damage tolerance (toughness vs. strength) for different materials (Nature Materials 10, 123-128, (2011).

FIG. 2 (obtained from U.S. Pat. No. 7,575,040) shows a time-temperature-transformation (TTT) cooling curve 200 of a bulk solidifying amorphous alloy, or TTT diagram. Bulk-solidifying amorphous metals do not experience a liquid/solid crystallization transformation upon cooling, as with conventional metals. Instead, the highly fluid, non-crystalline form of the metal found at high temperatures (near a "melting temperature" Tm) becomes more viscous as the temperature is reduced (near to the glass transition temperature Tg), eventually taking on the outward physical properties of a conventional solid. Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk-solidifying amorphous metal for forming the BMG parts. Furthermore, the cooling rate of the molten metal to form a BMG part has to be such that the time-temperature profile during cooling does not traverse through the nose-shaped region bounding the crystallized region in the TTT diagram of FIG. 2. In FIG. 2, $T_{nose}$ is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between 1012 Pa s at the glass transition temperature down to 105 Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 2, Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above $T_{nose}$ or below $T_{nose}$, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a $T_g$ at a certain temperature, a $T_x$ when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, C, Si, Ge, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used. The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function:

In the above function, s is the spin quantum number and x is the distance function within the particular system. This function is equal to unity when x=x' and decreases as the distance |x–x'| increases. Typically, it decays exponentially to zero at large distances, and the system is considered to be disordered. If, however, the correlation function decays to a constant value at large |x–x'|, then the system can be said to possess long-range order. If it decays to zero as a power of the distance, then it can be called quasi-long-range order. Note that what constitutes a large value of |x–x'| is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals presents in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low° of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals are a new class of materials that have a disordered, non-crystalline, glassy structure, which are created when metals or their alloys bypass nucleation and growth of crystalline phases during solidification either by cooling very quickly or because of a unique alloy composition. FIG. 1 (obtained from Nature Materials 10, 123-128, (2011)) shows the time-temperature-transformation (TTT) solidifying diagram of an exemplary amorphous and a crystalline alloy. The C shape of crystalline materials in TTT diagram is the result of the competition between the increasing driving force for crystallization and the slowing of kinetics (effective diffusivity) of the atoms. Both thermodynamic and kinetic parameters affect the crystallization and shift the C shape position to larger times.

The position of the nose determines the critical cooling rate to avoid nucleation and crystal growth during cooling and defines the conditions to manufacture amorphous alloys. In case of amorphous alloys instead of liquid/solid crystallization transformation, the molten material becomes more viscous as the temperature reduces near to the glass transformation temperature and transforms to a solid state after this temperature. In the liquid state, the atoms vibrate around positions and have no long-range ordering. Hence, the critical cooling rate is determined by atomic fluctuations, controlled by thermodynamic factor, rather than kinetic factor. Due to the crystallization bypass, the amorphous alloys remain the most prominent characteristics of the liquids, the absence of typical long-range ordered pattern of the atomic structure of crystalline alloys and any defects associated with it. This disordered, dense atomic arrangement determines the unique structural and functional properties of amorphous alloys.

Amorphous metals can be produced through a variety of quick-cooling methods. For instance, amorphous metals can be produced by sputtering molten metal onto a spinning metal disk. The rapid cooling, on the order of millions of degree a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one amorphous metal, known as VITROLOY™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embrittelment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sport equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt. %, such as at least about 40 wt. %, such as at least about 50 wt %, such as at least about 60 wt. %, such as at least about 80 wt. %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One embodiment of the described alloy system is a Zr—Ti—Ni—Cu—Be based amorphous alloy under the trade name VITROLOY™, such as Vitreloy-1 and Vitreloy-101, as fabricated by Liquidmetal Technologies, CA, USA. Some examples of amorphous alloys of the different systems are provided in Table 1 and Table 2

TABLE 1

Amorphous Alloy Compositions

| Alloy | At. % | At. % | At. % | At. % | At. % | At. % | At. % | At. % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |
| 3 | Pd | Cu | Co | P | | | | |
| | 44.48% | 32.35% | 4.05% | 19.11% | | | | |
| 4 | Pd | Ag | Si | P | | | | |
| | 77.50% | 6.00% | 9.00% | 7.50% | | | | |
| 5 | Pd | Ag | Si | P | Ge | | | |
| | 79.00% | 3.50% | 9.50% | 6.00% | 2.00% | | | |
| 5 | Pt | Cu | Ag | P | B | Si | | |
| | 74.70% | 1.50% | 0.30% | 18.0% | 4.00% | 1.50% | | |

TABLE 2

Additional Amorphous Alloy Compositions

| Alloy | Atm % | Atm % | Atm % | Atm % | Atm % | Atm % |
|---|---|---|---|---|---|---|
| 1 | Zr | Ti | Cu | Ni | Be | |
| | 41.20% | 13.80% | 12.50% | 10.00% | 22.50% | |
| 2 | Zr | Ti | Cu | Ni | Be | |
| | 44.00% | 11.00% | 10.00% | 10.00% | 25.00% | |
| 3 | Zr | Ti | Cu | Ni | Nb | Be |
| | 56.25% | 11.25% | 6.88% | 5.63% | 7.50% | 12.50% |
| 4 | Zr | Ti | Cu | Ni | Al | Be |
| | 64.75% | 5.60% | 14.90% | 11.15% | 2.60% | 1.00% |
| 5 | Zr | Ti | Cu | Ni | Al | |
| | 52.50% | 5.00% | 17.90% | 14.60% | 10.00% | |
| 6 | Zr | Nb | Cu | Ni | Al | |
| | 57.00% | 5.00% | 15.40% | 12.60% | 10.00% | |
| 7 | Zr | Cu | Ni | Al | | |
| | 50.75% | 36.23% | 4.03% | 9.00% | | |
| 8 | Zr | Ti | Cu | Ni | Be | |
| | 46.75% | 8.25% | 7.50% | 10.00% | 27.50% | |
| 9 | Zr | Ti | Ni | Be | | |
| | 21.67% | 43.33% | 7.50% | 27.50% | | |
| 10 | Zr | Ti | Cu | Be | | |
| | 35.00% | 30.00% | 7.50% | 27.50% | | |
| 11 | Zr | Ti | Co | Be | | |
| | 35.00% | 30.00% | 6.00% | 29.00% | | |
| 12 | Zr | Ti | Fe | Be | | |
| | 35.00% | 30.00% | 2.00% | 33.00% | | |
| 13 | Au | Ag | Pd | Cu | Si | |
| | 49.00% | 5.50% | 2.30% | 26.90% | 16.30% | |
| 14 | Au | Ag | Pd | Cu | Si | |
| | 50.90% | 3.00% | 2.30% | 27.80% | 16.00% | |
| 15 | Pt | Cu | Ni | P | | |
| | 57.50% | 14.70% | 5.30% | 22.50% | | |

TABLE 2-continued

Additional Amorphous Alloy Compositions

| Alloy | Atm % | Atm % | Atm % | Atm % | Atm % | Atm % |
|---|---|---|---|---|---|---|
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

Other ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the composition $Fe_{48}Cr_{15}Mo_{14}Y_2C_{15}B_6$. They also include the alloy systems described by Fe—Cr—Mo—(Y, Ln)-C—B, Co—Cr—Mo-Ln-C—B, Fe—Mn—Cr—Mo—(Y, Ln)-C—B, (Fe, Cr, Co)—(Mo, Mn)—(C,B)—Y, Fe—(Co, Ni)—(Zr, Nb, Ta)—(Mo, W)—B, Fe—(Al, Ga)—(P, C, B, Si, Ge), Fe—(Co, Cr, Mo, Ga, Sb)—P—B—C, (Fe, Co)—B—Si—Nb alloys, and Fe—(Cr—Mo)—(C,B)-Tm, where $L_n$ denotes a lanthanide element and $T_m$ denotes a transition metal element. Furthermore, the amorphous alloy can also be one of the compositions $Fe_{80}P_{12.5}C_5B_{2.5}$, $Fe_{80}P_{11}C_5B_{2.5}Si_{1.5}$, $Fe_{74.5}Mo_{5.5}P_{12.5}C_5B_{2.5}$, $Fe_{74.5}Mo_{5.5}P_{11}C_5B_{2.5}Si_{1.5}$, $Fe_{70}Mo_5Ni_5P_{12.5}C_5B_{2.5}$, $Fe_{70}Mo_5Ni_5P_{11}C_5B_{2.5}Si_{1.5}$, $Fe_{68}Mo_5Ni_5Cr_2P_{12.5}C_5B_{2.5}$, and $Fe_{68}Mo_5Ni_5Cr_2P_{11}C_5B_{2.5}Si_{1.5}$, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and U.S. Pat. No. 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One composition is $Fe_{72}Al_{15}Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The described amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

Renewable Energy Resources

"The current energy supply depends mainly on fossil energy carriers . . . fossil fuels such as natural gas, petroleum, hard and brown coal needed many thousands of years to form." [Volker Quaschning. Understanding renewable energy systems, Copyright © Carl Hanser Verlag GmbH & Co KG, 2005, ISBN: 1-84407-128-6]. "However, due to the increasing exploitation of the fossil reservoirs, future extraction will be more and more difficult, technically challenging and risky and therefore much more expensive than today. Deep-sea oil rigs are one step in this development. If fossil fuel use continues unchecked, all available reserves of petroleum and natural gas will be exploited within the 21st century." [Volker Quaschning. Understanding renewable energy systems, Copyright © Carl Hanser Verlag GmbH & Co KG, 2005, ISBN: 1-84407-128-6]. "Thus, some decades from now, a few generations of humanity will have exploited the whole fossil energy reserves that required millions of years to form." [Volker Quaschning. Understanding renewable energy systems, Copyright © Carl Hanser Verlag GmbH & Co KG, 2005, ISBN: 1-84407-128-6] In addition to being a rapidly depleting resource, fossil fuels also have an adverse effect on the environment. If humanity does not "reduce anthropogenic greenhouse gas emissions, the carbon dioxide concentration in the atmosphere will more than double by the end of this century with respect to pre-industrial values. As a result, the mean global temperature will rise more than 2° C." [Volker Quaschning. Understanding renewable energy systems, Copyright © Carl Hanser Verlag GmbH & Co KG, 2005, ISBN: 1-84407-128-6] Therefore, there is a pressing need for renewable energy resources. Renewable energy resources are "energy resources that are inexhaustible within the time horizon of humanity. Renewable types of energy can be subdivided into three areas: solar energy, planetary energy and geothermal energy." [Volker Quaschning. Understanding renewable energy systems, Copyright © Carl Hanser Verlag GmbH & Co KG, 2005, ISBN: 1-84407-128-6]

Solar Energy

Solar energy is a very potent renewable and sustainable energy resource. The energy of the sun striking the USA is about $2.8 \times 10^{23}$ Joules per year, which is three thousand times for energy than the current US energy consumption. Despite this vast surplus, only 10% of US annual energy consumption. ["U.S. Energy Information Administration—EIA—Independent Statistics and Analysis." *How Much of U.S. Energy Consumption and Electricity Generation Comes from Renewable Energy Sources?—FAQ—U.S. Energy Information Administration (EIA)*, U.S. Energy Information Administration, 2018] There are two ways of producing electricity using solar energy: Photovoltaic systems and Concentrated Solar Power.

Photovoltaic Systems:

A photovoltaic system is composed of "one or more solar panels combined with an inverter and other electrical and mechanical hardware that use energy from the Sun to generate electricity." [J.M.K.C. Donev et al. (2018). Energy Education—Photovoltaic system [Online]. Available: https://energyeducation.ca/encyclopedia/Photovoltaic_system. [Accessed: Aug. 11, 2019]] In this system, "the light from the Sun, made up of packets of energy called photons, falls onto a solar panel and creates an electric current. Each panel produces a relatively small amount of energy, but can be linked together with other panels to produce higher amounts of energy as a solar array." [J.M.K.C. Donev et al. (2018). Energy Education—Photovoltaic system [Online]. Available: https://energyeducation.ca/encyclopedia/Photovoltaic_system. [Accessed: Aug. 11, 2019]. However, "the electricity produced from a solar panel (or array) is in the form of direct current." [J.M.K.C. Donev et al. (2018). Energy Education—Photovoltaic system [Online]. Available: https://energyeducation.ca/encyclopedia/Photovoltaic_system. [Accessed: Aug. 11, 2019]].

Direct current is "an electric current that is uni-directional, so the flow of charge is always in the same direction." [J.M.K.C. Donev et al. (2018). Energy Education—Alternating current [Online]. Available: https://energyeducation.ca/encyclopedia/Alternating_current. [Accessed: Aug. 11, 2019]]. However, the electrical utility grid which provides (and requires) alternating current (AC). Therefore, in order for the solar electricity to be useful it must first be converted from DC to AC using an inverter." [J.M.K.C. Donev et al. (2018). Energy Education—Photovoltaic system [Online]. Available: https://energyeducation.ca/encyclopedia/Photovoltaic_system. [Accessed: Aug. 11, 2019]]. An inverter is "an electrical device which accepts electrical current in the form of direct current (DC) and converts it to alternating current (AC)." [J.M.K.C. Donev et al. (2018). Energy Education—Photovoltaic system [Online]. Available: https://energyeducation.ca/encyclopedia/Photovoltaic_system. [Accessed: Aug. 11, 2019]]. Alternating current "[flips] the direction of charge flow." [J.M.K.C. Donev et al. (2018). Energy Education Alternating current [Online]. Available: https://energyeducation.ca/encyclopedia/Alternating_current. [Accessed: Aug. 11, 2019]]. The other components of a typical photovoltaic system include "combiners, disconnects, breakers, meters and wiring." [J.M.K.C. Donev et al. (2018). Energy Education—Photovoltaic_system [Online]. Available: https://energyeducation.ca/encyclopedia/Photovoltaic_system. [Accessed: Aug. 11, 2019]]. A combiner in this case "combines two or more electrical cables into one larger one." [J.M.K.C. Donev et al. (2018). Energy Education—Photovoltaic_system [Online]. Available: https://energyeducation.ca/encyclopedia/Photovoltaic_system. [Accessed: Aug. 11, 2019]]. Disconnects are "electrical gates or switches which allow for manual disconnection of an electrical wire." [J.M.K.C. Donev et al. (2018). Energy Education—Photovoltaic_system [Online]. Available: https://energyeducation.ca/encyclopedia/Photovoltaic_system. [Accessed: Aug. 11, 2019]]. "The disconnects provide electrical isolation when an inverter needs to be installed or replaced." [J.M.K.C. Donev et al. (2018). Energy Education—Photovoltaic_system [Online]. Available: https://energyeducation.ca/encyclopedia/Photovoltaic_system. [Accessed: Aug. 11, 2019]]. Circuit breakers protect the circuits contained within the photovoltaic systems from damaging power surges. The electric meter "measures the amount of energy that passes through it and is commonly used by electric utility companies to measure and charge customers." [J.M.K.C. Donev et al. (2018). Energy Education—Photovoltaic_system [Online]. Available: https://energyeducation.ca/encyclopedia/Photovoltaic_system. [Accessed: Aug. 11, 2019]]. The wiring is used to "transport the electrical energy from and between each component and must be properly sized to carry the current." [J.M.K.C. Donev et al. (2018). Energy Education—Photovoltaic_system [Online]. Available: https://energyeducation.ca/encyclopedia/Photovoltaic_system. [Accessed: Aug. 11, 2019]].

Concentrated Solar Power (CSP)

"Unlike solar (photovoltaic) cells, which use light to produce electricity, concentrating solar power systems generate electricity with heat." [Concentrating Solar Power: Energy From Mirrors," U.S. Department of Energy, DOE/GO-102001-1147, March 2001.] Additionally, of all the technologies being developed for solar thermal power generation, central receiver systems (CRS) are able to work at the highest temperatures and to achieve higher efficiencies in electricity production" [Ignacio Ortega, J & Burgaleta, Juan & Tellez, Felix. (2008). Central Receiver System Solar Power Plant Using Molten Salt as Heat Transfer Fluid. Journal of Solar Energy Engineering-Transactions of the ASME-J SOL ENERGY ENG. 130. 10.1115/1.2807210.]. Concentrating solar collectors use mirrors and lenses to concentrate and focus sunlight onto a thermal receiver. The receiver absorbs and converts sunlight into heat. The heat is then transported to a steam generator or engine where it is converted into electricity. There are three main types of CSP systems: parabolic troughs, dish/engine systems, and central receiver systems.

Trough systems use parabolic troughs lined with mirrors. These troughs have oil filled pipes running through the center. ["Concentrating Solar Power (CSP) Technologies." *Concentrating Solar Power (CSP) Technology*, Solar Energy Development Programmatic EIS, solareis.anl.gov/guide/solar/csp/.]. The energy from the sun heats the oil which is flowing in the tubes, and the energy generated from the heat is used to create energy in a steam generator. ["Concentrating Solar Power: Energy From Mirrors," U.S. Department of Energy, DOE/GO-102001-1147, March 2001.]. Troughs are often placed in parallel rows, referred to as a collector field. The troughs are lined along a north-south axis to ensure that the sun is always focusing on the receiver as the day progresses.

Dish systems use "dish shaped parabolic mirrors as reflectors to concentrate and focus the sun's rays onto a receiver, which is mounted above the dish at the dish center." [Concentrating Solar Power: Energy From Mirrors," U.S. Department of Energy, DOE/GO-102001-1147, March 2001.]. The dish system is composed of a collector, receiver, and engine. The dish system operates by collecting and then concentrating the sun's energy with the dish shaped surface "onto a receiver that absorbs the energy and transfers it to the engine. The engine then converts that energy to heat." [Concentrating Solar Power: Energy From Mirrors," U.S. Department of Energy, DOE/GO-102001-1147, March 2001.].

The heat is then converted into mechanical power. This occurs by the following process: the working fluid is compressed when it is cold, then this compressed working fluid is heated. Then, it is expanded through a turbine or piston to generate mechanical power.

The third type of system, the central receiver system, has five main components: heliostats, receiver, heat transport and exchange, thermal storage, and controls. The central receiver system operates as follows: "thousands of individual sun-tracking mirrors called heliostats reflect solar energy onto a receiver positioned on the top of a tall tower. Then, "the receiver collects the sun's heat in a heat-transfer fluid (molten salt) that flows through the receiver." [Concentrating Solar Power: Energy From Mirrors," U.S. Department of Energy, DOE/GO-102001-1147, March 2001.]. "The salt's heat energy is then used to make steam to generate electricity in a conventional steam generator." [Concentrating Solar Power: Energy From Mirrors," U.S. Department of Energy, DOE/GO-102001-1147, March 2001.]. The molten salt storage system retains heat in an efficient manner, so it can be stored up to days prior to being used to generate electricity.

Heat Transfer Fluids Used in CSP

In the CSP system, the heat transfer fluid is used in the receiver. The receiver "heats up due to the incoming solar radiation flux and transmits heat to a heat transfer fluid. This fluid is usually water, air, or molten salt. The heat transfer fluid is then used, directly or indirectly, to run a turbine that produces electricity through a generator." [Murray, Daniel. (2012). Small-Scale Solar Central Receiver System Design and Analysis.]. Substances considered to be good candidates for heat transfer fluids typically have "high thermal conductivities, such as liquid sodium, water/steam, or molten nitrate salt." [Murray, Daniel. (2012). Small-Scale Solar Central Receiver System Design and Analysis.].

Molten Salts

Molten salts present many advantages for use as the heat transfer fluid in the CSP system, including "a lower operating pressure and better heat transfer (and thus higher allowable incident flux) than a water/steam receiver. This translates into a smaller, more efficient, and lower cost receiver and support tower. In addition, the relatively inexpensive salt can be stored in large tanks at atmospheric pressure, allowing 1) economic and efficient storage of thermal power collected early in the day for use during peak demand periods; 2) increased plant capacity factor by oversizing of the collector and receiver systems with storage of the excess thermal energy for electricity generation in the evening; 3) isolation of the turbine-generator from solar energy transients; and 4) operation of the turbine at maximum efficiency." [Tyner, C. E., Sutherland, J. P., and Gould, W. R. Jr. *Solar two: A molten salt power tower demonstration*. United States: N. p., 1995. Web.]. "To date, Solar Energy Technologies Office (SETO) has identified molten chloride salts (for example, a eutectic mixture of KCl—$MgCl_2$, among other possible compositions) as a highly promising heat transfer fluid (HTF) and thermal energy storage (TES) media capable of operating between 550° C. and 750° C." [FY2017 Phase I Release II Solicitation].

*Science and Engineering*, UNSW Sydney, 12 Dec. 2013]. Corrosion can be classified in different ways, such as: "chemical and electrochemical, high temperature and low temperature, and wet corrosion and dry corrosion." [Corrosion: Introduction —Definitions and Types." NP TEL Web Course, National Programme on Technology Enhanced Learning, nptel.ac.in/courses/113108051/module1/lecture1.pdf]

Dry corrosion occurs in the absence of aqueous "environment[s], usually in the presence of gases and vapors, mainly at high temperatures." [Corrosion: Introduction—Definitions and Types." *NPTEL Web Course*, National Programme on Technology Enhanced Learning, nptel.ac.in/courses/113108051/module1/lecture1.pdf]. Steel, a metal commonly used in piping and various other applications, is very susceptible to corrosion. The corrosion of steel is an electrochemical reaction. It involves the ionization of "metal atoms and the loss of these ions into solution or into a corrosion product. Since the ionization reaction means giving up electrons, a flow of electrons away from the site of this reaction must occur to avoid a build-up of negative charge." [Sniderman, Debbie. "Salt Heat Transfer Fluids in CSP." *ASME*, The American Society of Mechanical Engineers, 1 Feb. 2012]. Another type of corrosion is pitting type corrosion. "Pitting corrosion is localized accelerated dissolution of metal that occurs as a result of a breakdown of the otherwise protective passive film on the metal surface." [Frankel, G. S. "Pitting Corrosion of Metals." *Journal of The Electrochemical Society*, vol. 145, no. 6, 1998, pp. 2186-2198, doi:10.1149/1.1838615.].

Passivity is a "loss of electrochemical reactivity (drastic decrease in corrosion rate) that many engineering alloys (e.g. stainless steel, Ni-based alloys, Al alloys) exhibit under certain environmental conditions." ["Passivity." Electroanalytical Chemistry, Michigan State University, 2016]. Passivation "is the result of the presence of a thin protective oxide or oxyhydroxide passive film on the metal surface." ["Passivity." Electroanalytical Chemistry, Michigan State University, 2016]. There is a thin shell of protection against corrosion. However, this passive film or passivation layer is

TABLE 3

Cooling Materials Properties

| | Heat Transfer Ranking at 700° C. | | Eutectic [° C.] | Boiling [° C.] | Heat Capacity | Estimated Raw Materials Costs $/L at |
|---|---|---|---|---|---|---|
| | Laminar | Turbulent | Temperature | Temperature | [cal/g-° C.] | 700 C. |
| Water (calcs done at 300° C.) | 0.63 | 4.84 | — | 100 | 1 | — |
| Pb | 5.36 | 28.53 | — | 1749 | 0.031 | 4.1 |
| KCl—$MgCl_2$ | 7.74 | 21.08 | 426 | >1418 | 0.229 | 0.35 |
| NaCl—$MgCl_2$ | 7.81 | 21.7 | 475 | >1465 | 0.262 | 0.42 |
| LiF—NaF—KF | 6.61 | 13.3 | 454 | 1570 | 0.387 | 15.79 |

Theory of Corrosion of Metals:

Corrosion is defined as "destructive and unintentional degradation of a material caused by its environment." [School of Materials Science and Engineering." 1*: What Is Corrosion?|School of Materials Science and Engineering*, UNSW Sydney, 12 Dec. 2013.]. Metals are particularly susceptible to corrosion, and nearly all "environments can cause corrosion to some degree, since the corroded state is the more stable state." [School of Materials Science and Engineering." 1*: What Is Corrosion?|School of Materials*

"susceptible to localized breakdown resulting in accelerated dissolution of the underlying metal. ["Frankel, G. S. "Pitting Corrosion of Metals." *Journal of The Electrochemical Society*, vol. 145, no. 6, 1998, pp. 2186-2198, doi:10.1149/1.1838615.].

"Pitting corrosion will only occur in the presence of aggressive anionic species, and chloride ions are usually, although not always, the cause" [Frankel, G. S. "Pitting Corrosion of Metals." *Journal of The Electrochemical Society*, vol. 145, no. 6, 1998, pp. 2186-2198, doi:10.1149/

1.1838615.]. "Pitting is considered to be autocatalytic in nature; once a pit starts to grow, the conditions developed are such that further pit growth is promoted." [Frankel, G. S. "Pitting Corrosion of Metals." *Journal of The Electrochemical Society*, vol. 145, no. 6, 1998, pp. 2186-2198, doi: 10.1149/1.1838615.]. Amorphous metals are more corrosion resistant compared to conventional metals due to the lack of long-range periodicity, related grain boundaries and crystal defects such as dislocations. In addition, they are stronger than crystalline metals and they can sustain larger reversible deformations than crystalline alloys (FIG. 2). Due to their unique microstructure, amorphous metals combine ultrahigh strength, high hardness and ductility in one single material.

Molten Salt Corrosion:

Molten salts are candidates "for CSP applications because of their high decomposition temperatures and good thermal properties; but they can be corrosive to common alloys used in vessels, heat exchangers, and piping at these elevated temperatures" [Ho, Clifford K. *Advances in central receivers for concentrating solar applications*. United States: N. p., 2017. Web. doi:10.1016/j.solener.2017.03.048.]. For example, in a test conducted involving molten chloride salt, "bare stainless steel alloys tested in a molten chloride corroded as fast as 4,500 micrometers per year" [News Release: NREL Investigates Coatings Needed for Concentrating Solar Power." *NREL.gov*, National Renewable Energy Laboratory, 18 Sept. 2018].

In addition, 316L stainless steel, which is commonly used in CSP applications, corrodes under molten salt environments. "Containment material degradation is a major concern to meet commercial viability of next generation CSP plants" [Gomez-Vidal, Judith C., and Tirawat, Robert. *Corrosion of alloys in a chloride molten salt (NaCl-LiCl) for solar thermal technologies*. United States: N. p., 2016. Web. doi:10.1016/j.solmat.2016.05.052.] 316L stainless steel (SS) is commonly as piping used due to its mechanical durability, resistance against corrosion under severe environment and cost of material. However, 316L SS corrodes under molten salt environment since the chromium oxide protection layer gets destroyed and pitting type corrosion occurs.

Materials Demonstrating Essential Properties:

Materials used under molten salt environments at high temperatures should have the following properties: Strength over time, long-term creep, and corrosion resistance to molten salts. [C.W. Forsberg: The Advanced High-Temperature Reactor: High Temperature Fuel, Liquid Salt Coolant, Liquid-Metal-Reactor Plant," Prog. Nucl. Energy, (2005) 47 32-43]. In a recent research work done from Savannah River National Laboratory, University of South Carolina and University of Alabama, different kinds of Ni-based alloys have been tested under molten chloride salt environment. The research showed that Incoloy 800H has the highest general corrosion rate but does not show any localized corrosion. Haynes NS163 shows second highest general corrosion despite being a Co based alloy and localized corrosion, while Haynes 230 shows lowest corrosion with passivation until Ni oxidized (passive layer breaks down). The research summarized that all Ni-based alloys tested have corrosion potentials between 2.26 and 2.31V and explained that corrosion occurs along boundaries in alloys. Researcher at Oak Ridge National Laboratory (ORNL) and Idaho National Laboratory tested corrosion resistance of various alloys under $KCl-MgCl_2$ molten salt environment. They showed that Haynes 230 exhibited the least mass loss from the exposure to molten $KCl-MgCl_2$, while Hastelloy N exhibited the least grain boundary attack and chromium dissolution. Despite moderate mass loss, 316 stainless steel (SS) exhibited the worst grain boundary attack with chromium depletion to 300 micrometers depth during the 100 hours exposure. Luke Olson and Sridharan, et al also measured corrosion rates of different alloys in $KCl-MgCl_2$ molten environment (Table 2).

TABLE 4

Comparison of corrosion rates of various alloys at 850° C. by using quartz crucible

| Alloy | Corrosion rate [mm/y] |
| --- | --- |
| Hastelloy N | 1.1 |
| Hastelloy X | 1.1 |
| Inconel 617 | 1.3 |
| Haynes 230 | 0.67 |
| Incoloy 800H | 1.4 |

However, the ultimate tensile strength of all Ni-based alloys reduces rapidly after 600° C. Cho et al. studied and modelled the corrosion resistance of Fe—Ni—Cr alloy under $KCl-MgCl_2$ at a temperature range of 700° C. to 1,000° C. The experiment results and the model predictions showed that the selective Cr corrosion is mass transfer driven and the depletion could be further increased in CSP systems with forced convection. Several coatings including iron- and nickel-based alloys, nickel electroplating, molybdenum thermal spray, and diamond like coatings and post-processing techniques were investigated at University of Wisconsin-Madison. They showed that Ni-electroplated coatings were the most promising, while Mo thermal spray and diamond like carbon coatings had spalling issues. The Ni-plating was shown to greatly reduce the rate of corrosion due to chromium dealloying from the base alloy.

The materials that are most promising with regards to fulfilling the three criteria mentioned previously in this section are amorphous alloys containing metals such as Fe, Cr, Cu, Ni, Co, Al, Mo, Ti, Si, as well as nonmetals such as C, B, and others.

Spraying Process which Ensures Amorphous Structure is Retained

The amorphous coating can be in powder or wire form and sprayed using conventional thermal spraying techniques. The thermal spraying technique could be used to apply the material onto the substrate. The main advantages of using the thermal spraying technique include the fact that a wide range of materials (polymers, metals, metallic alloys, ceramics and composites) can be used as the feedstock, almost all substrates can be coated. Additionally, there is low thermal stress on the substrate parts (meaning that the substrate will not melt), high deposition rates. The thermal spraying process is available as a field service, meaning the process can occur on the client's property. Lastly, thermal spraying is suitable for large scale components coating, and coating of complex geometries. The thermal spraying process, combined with the structure of the invention, ensures that the amorphous structure of the sprayed amorphous material is retained, since the cooling rate during this process is in the range of $1 \times 10^8$ K/s. This rate is sufficiently high to ensure that crystallization will not occur, since "The minimum cooling rates for glass formation has been reported to be above $10-10^4$ K/s for Fe-, Co- and Ni-based amorphous alloys." [010-005]. The connection between the amorphous state and the glass state is that "amorphous metals have a . . . glassy structure" [from their paper]. The amorphous coatings have high wear resistance, low coefficient of friction, high corrosion resistance, and adjusted thermal expansion coefficient.

Advantages

Advantages of the disclosed embodiments include providing an amorphous based alloy which provides full corrosion resistance against molten salts, including at high temperatures. The amorphous based metal coatings offer novel performance and cost breakthroughs. The amorphous alloys offer: corrosion protection against severe corrosion, corrosion protection at high temperatures, corrosion protection against molten chloride salt, corrosion protection against molten fluoride salt, corrosion protection against molten sulphate salt, erosion/corrosion protection, and the fact that material could be in powder or wire form and sprayed using conventional thermal sprayed techniques including, HVOF, cold spraying, twin arc and plasma Spraying.

The advantages are: unique structure with a controlled chemical composition, high corrosion resistance (no corrosion signs after 300 hours testing at 750° C.), wear characteristics better than Ni-based alloys, dense coatings without cracks, corrosion resistant chemistry and better than current WC-based coatings. Additional advantages are high strength-to-weight ratio (for example amorphous alloys have a strength-to-weight ratio 1.9×higher than titanium: amorphous alloys with a strength 2,000-3,500 MPa and density 5-7 g/cm$^3$ have a strength-to-weight ratio of 400-500, while titanium alloys have a strength-to-weight ratio is 260 with a strength of 1,250 MPa and density; a strength-to-weight ratio of 3.3×higher than Inconel:Inconel strength 1,250 MPa and density 8.28 g/cm$^3$), Adjustable thermal expansion coefficient according to the base materials (usually steel or Ni-based alloy), Superior spallation resistance for highly stressed parts due to the amorphous structure, lo limitation on parts geometry and dimensions. and significantly lower cost.

EMBODIMENTS

An embodiment relates to material comprising an amorphous metal ceramic composite, wherein the material exhibits corrosion resistance to a molten potassium chloride salt or a molten magnesium chloride salt at a temperature up to 800° C.

In an embodiment, the material is configured to be a component of a solar concentrator and the material in the component has an ability to withstand temperatures up to 800° C. without corrosion in the presence of molten chloride salt such as potassium magnesium chloride salt or carnalite salt.

In an embodiment, the material is configured to be a coating and the material in the coating has an ability to withstand temperatures up to 800° C. without corrosion in the presence of molten chloride salt such as potassium magnesium chloride salt or carnallite salt.

An embodiment relates to material comprising an amorphous metal ceramic composite, wherein the material exhibits corrosion resistance for at least 30 years to a molten chloride salt such as potassium magnesium chloride salt or carnallite salt at temperatures up to 800° C.

An embodiment relates to material comprising an amorphous metal ceramic composite, wherein the material exhibits a higher corrosion resistance than that of Haynes 230 to a chloride salt such as potassium magnesium chloride salt or carnallite salt at temperatures up to 800° C.

An embodiment relates to material that is formed from an amorphous material that is partially or fully amorphous comprising of an alloy, wherein the amorphous material is either thermally and/or non-thermally sprayed as a coating and heated to a temperature above 600° C. The coating remains unchanged up to 600° C. In an embodiment, above 600° C., the amorphous material in the coating converts to a partially or fully crystalline material. In an embodiment, above 600° C., the amorphous material in the coating converts to an amorphous metal ceramic composite.

An embodiment relates to material that is formed from an amorphous material that is partially or fully amorphous comprising a nickel-based alloy and/or an iron-based alloy, wherein the amorphous material is thermally sprayed as a coating and heated to a temperature above 600° C. The coating remains unchanged up to 600° C. In an embodiment, above 600° C., the amorphous material in the coating converts to a partially or fully crystalline material. In an embodiment, above 600° C., the amorphous material in the coating converts to an amorphous metal ceramic composite.

An embodiment relates to material that is formed from an amorphous material that is partially or fully amorphous comprising other than a nickel-based alloy and/or an iron-based alloy, wherein the amorphous material is thermally sprayed as a coating and heated to a temperature above 600° C. The coating remains unchanged up to 600° C. In an embodiment, above 600° C., the amorphous material in the coating converts to a partially or fully crystalline material. In an embodiment, above 600° C., the amorphous material in the coating converts to an amorphous metal ceramic composite.

In an embodiment, the amorphous metal ceramic composite comprises a thermal ceramic containing a combination of borides and carbides. The amorphous metal ceramic composite is not fully amorphous above 600° C., but still exhibits corrosion resistance to a molten potassium chloride salt or a molten magnesium chloride salt at temperatures up to 800° C.

In an embodiment the material comprising an amorphous metal ceramic composite is not corroded for 300 hours, at 750° C. whereas Haynes 230 corrodes within 300 hours at 750° C.

In an embodiment the material comprising an amorphous metal ceramic composite are corrosion resistant at temperature about 400° C. to 500° C.

In an embodiment the material comprising an amorphous metal ceramic composite are component of a system such as a pump or a tank or a pipe, wherein the system stores chlorides/salts and/or pump chlorides/salts from one place to another. In an embodiment the material comprising an amorphous metal ceramic composite are component of a nuclear facility and/or a nuclear reactor employing chlorides for a better efficiency of the energy.

In an embodiment the material comprising an amorphous metal ceramic composite is component of a power supply such as a battery.

An embodiment relates to renewable energy resources and the need for corrosion resistance to molten salts. The most generic form of this patent is a material coating used to cover pipes used in the renewable energy sector. This material presented in this patent is an amorphous metal-based coating that transforms to a ceramic at temperatures above 600° C. There are many attractive properties resulting from this transformation. Aside from maintaining the corrosion resistance, the properties the ceramic has are: unique structure with a controlled chemical composition, high corrosion resistance (no corrosion signs after 300 hours testing at 750° C.), wear characteristics better than Ni-based alloys and better than current WC-based coatings.

In an embodiment the material comprising an amorphous metal ceramic composite has high strength-to-weight ratio (for example amorphous alloys have a strength-to-weight ratio 1.9× higher than titanium:amorphous alloys with a strength 2,000-3,500 MPa and density 5-7 g/cm$^3$ have a strength-to-weight ratio of 400-500, while titanium alloys have a strength-to-weight ratio is 260 with a strength of 1,250 MPa and density; a strength-to-weight ratio of 3.3× higher than Inconel:Inconel strength 1,250 MPa and density 8.28 g/cm$^3$), adjustable thermal expansion coefficient according to the base materials (usually steel or Ni-based alloy), superior spallation resistance for highly stressed parts due to the amorphous structure, no limitation on parts geometry and dimensions, and a significantly lower cost.

In an embodiment the material comprising an amorphous metal ceramic composite has strength over time, long-term creep, and corrosion resistance to molten salts. If the materials to which this coating were to be applied to did not have the coating on it, it would experience pitting type corrosion, which is localized breakdown and dissolution of the metal.

An embodiment relates to concentrated solar power systems, or CSP, and the need for corrosion resistance to molten salts.

An embodiment relates to concentrating solar collectors that use mirrors and lenses to concentrate and focus sunlight onto a thermal receiver. The receiver absorbs and converts sunlight into heat.

In an embodiment the material is an amorphous metal-based coating that transforms to a ceramic at temperatures such as 500° C., or such as 600° C., or such as 650° C. or such as 700° C. The amorphous metal ceramic composite has controlled chemical composition, high corrosion resistance (no corrosion signs after 300 hours testing at 750° C.), wear characteristics better than Ni-based alloys and better than current WC-based coatings. In addition, the amorphous metal ceramic composite has high strength-to-weight ratio (for example amorphous alloys have a strength-to-weight ratio 1.9×higher than titanium:amorphous alloys with a strength 2,000-3,500 MPa and density 5-7 g/cm$^3$ have a strength-to-weight ratio of 400-500, while titanium alloys have a strength-to-weight ratio is 260 with a strength of 1,250 MPa and density; a strength-to-weight ratio of 3.3× higher than Inconel:Inconel strength 1,250 MPa and density 8.28 g/cm$^3$), adjustable thermal expansion coefficient according to the base materials (usually steel or Ni-based alloy), superior spallation resistance for highly stressed parts due to the amorphous structure, no limitation on parts geometry and dimensions, and a significantly lower cost.

In an embodiment the material comprising an amorphous metal ceramic composite has strength over time, long-term creep, and corrosion resistance to molten salts An embodiment relates to heat transfer fluids used in CSP systems, and the need for corrosion resistance to molten salts. In the CSP system, the heat transfer fluid is used in the receiver. The receiver heats to the incoming solar radiation flux and transmits heat to a heat transfer fluid. This fluid is usually water, air, or molten salt. The heat transfer fluid is used, directly or indirectly, to run a turbine to produce electricity through a generator.

In an embodiment the material comprising an amorphous metal ceramic composite has: strength over time, long term creep, and corrosion resistance to molten salts.

In an embodiment the material is formed from an amorphous material comprising an alloy containing metals such as Fe, Cr, Cu, Ni, Co, Al, Mo, Ti, metalloid such as Si as well as nonmetals such as C, B, etc.

An embodiment relates to a process of forming the material from an amorphous material that is partially or fully amorphous material. The is formed from an amorphous material, when combined with the unique structure of the inventive materials, ensure that the amorphous structure of sprayed amorphous materials is retained since the cooling rate during thermal spraying process is in the range of 1×10$^8$K/s [Systems and methods for fabricating objects including amorphous metal using techniques akin to additive manufacturing, US 20140202595 A1]. This spraying process is called thermal spraying, and it can be used to apply the material in powder or wire form. The thermal spraying technique could be used to apply the material onto the substrate. The main advantages of using the thermal spraying technique include the fact that a wide range of materials (polymers, metals, metallic alloys, ceramics and composites) can be used as the feedstock, almost all substrates can be coated. Additionally, there is low thermal stress on the substrate parts (meaning that the substrate will not melt), high deposition rates. The thermal spraying process is available as a field service, meaning the process can occur on the client's property. Lastly, thermal spraying is suitable for large scale components coating, and coating of complex geometries. The thermal spraying process, combined with the structure of the invention, ensures that the amorphous structure of the sprayed amorphous material is retained, since the cooling rate during this process is in the range of 1×10$^8$ K/s. This rate is sufficiently high to ensure that crystallization will not occur, since "The minimum cooling rates for glass formation has been reported to be in the range of 10-10$^4$ K/s for Fe-, Co- and Ni-based amorphous alloys." [010-005]. The connection between the amorphous state and the glass state is that amorphous metals have a glassy structure.

Coatings feature high ductility, high hardness, superior spallation resistance for highly stressed parts, high wear resistance and low friction through the appropriate structure and composition. These coatings can be catered to a variety of applications to meet evolving technology requirements, with the following material properties of interest for engine/driveline systems materials: high wear resistance; low coefficient of friction; high corrosion resistance; and adjusted thermal expansion coefficient.

This material presented in this patent is an amorphous metal-based coating that transforms to a ceramic at temperatures such as above 600° C., such as 600° C., such as 650° C. or such as 700° C. There are many attractive properties resulting from this transformation. Aside from maintaining the corrosion resistance, the properties the ceramic has are: unique structure with a controlled chemical composition, high corrosion resistance, wear characteristics better than Ni-based alloys and better than current WC-based coatings. In addition, the ceramic material has high strength-to-weight ratio (for example amorphous alloys have a strength-to-weight ratio 1.9× higher than titanium: amorphous alloys with a strength 2,000-3,500 MPa and density 5-7 g/cm$^3$ have a strength-to-weight ratio of 400-500, while titanium alloys have a strength-to-weight ratio is 260 with a strength of 1,250 MPa and density; a strength-to-weight ratio of 3.3× higher than Inconel:Inconel strength 1,250 MPa and density 8.28 g/cm$^3$), adjustable thermal expansion coefficient according to the base materials (usually steel or Ni-based alloy), superior spallation resistance for highly stressed parts due to the amorphous structure, no limitation on parts geometry and dimensions, and a significantly lower cost. In order for a material to be effective at resisting corrosion under molten salt environments, it must have the following properties: corrosion resistance to molten salts, strength over time and long-term creep, and. If the materials to which this coating were to be applied to did not have the coating on it, it would experience intergranular type corrosion, which is localized breakdown and dissolution of the metal. Current products available on the market offer only lackluster performance.

EXAMPLES

Example 1

Figure 3:
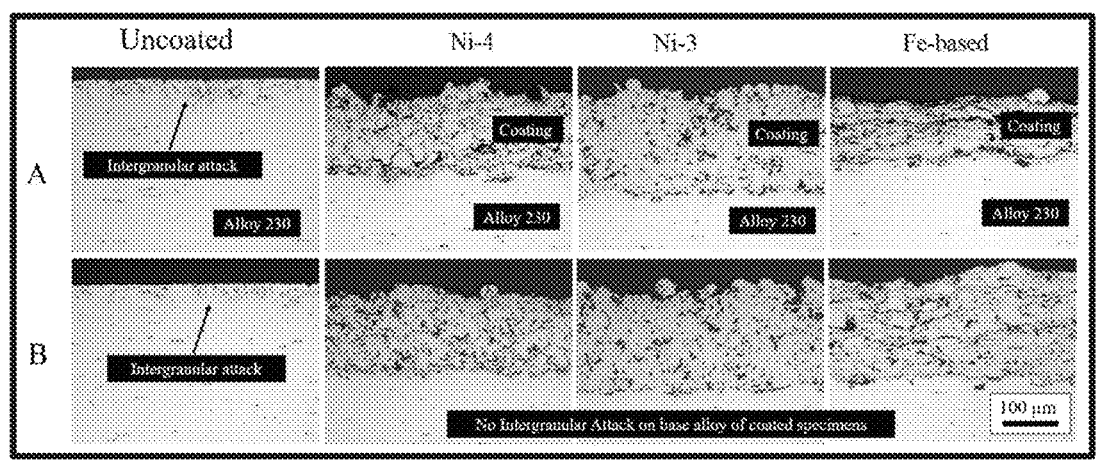
FIG. 3 Shows the cross-sectional micrographs of coated and uncoated Alloy 230 exposed to $KCl-MgCl_2$ for 300 hours at 750° C.

An embodiment relates to an Ni based amorphous alloy which provides corrosion resistance against molten salts. The amorphous metal Ni based alloy 1 is prepared from the proper elements in powdered form. The powder comprising the Ni based amorphous alloy 1 (marked Ni-4) is applied to a substrate by a High Velocity Oxy-Fuel (HVOF) thermal spraying process. Preferably the said powder has a particle size from 10 micrometers to 60 micrometers. The thermal spraying melts the particles, then atomizes them and sprays them onto the substrate at high velocities, quenching on the substrate and providing an amorphous coating. Another layer was applied, using the same process, and bonded with the previous layer. To test the efficacy of the coating in corrosion resistance, samples with dimensions 20×10×2 mm and from Haynes 230 (Alloy 230) were prepared. Three samples each of coated sample were exposed, along with samples of uncoated Haynes 230. Samples were exposed to molten KCl—$MgCl_2$ in a 68/32 ratio for 300 hours at 750° C. Optical micrographs of representative samples before and after exposure are shown in FIG. 3. After the exposure time is finished, the capsules were flipped vertically to allow the salt mixture to drain from the sample surface, and the capsules were cooled in room temperature. The samples were metallographically mounted and polished to examine the cross sections. As expected, the uncoated alloy Haynes 230 specimens exhibited significant intergranular attack. The coated specimens showed no attack on the base alloy Haynes 230 at all. As expected, the uncoated Alloy 230 samples had significant Cr depletion along grain boundaries near the surfaces. The coated samples not only showed no Cr depletion in the base metal but exhibited no Cr depletion in the coatings either. The depth of attack was measured on uncoated samples (40 measurements per sample) based on the SEM-EDS analysis. The median depth of attack is 33 μm for 300 hours. This material presented in this patent is an amorphous metal-based coating that transforms to a ceramic at temperatures above 600° C. There are many attractive properties resulting from this transformation. Aside from maintaining the corrosion resistance, the properties the ceramic has are: unique structure with a controlled chemical composition, high corrosion resistance (no corrosion signs after 300 hours testing at 750° C.) and wear characteristics better than Ni-based alloys, dense coatings without cracks and corrosion resistant chemistry. In addition, the ceramic material has high strength-to-weight ratio (for example amorphous alloys have a strength-to-weight ratio 1.9× higher than titanium:amorphous alloys with a strength 2,000-3,500 MPa and density 5-7 g/cm$^3$ have a strength-to-weight ratio of 400-500, while titanium alloys have a strength-to-weight ratio is 260 with a strength of 1,250 MPa and density; a strength-to-weight ratio of 3.3× higher than Inconel:Inconel strength 1,250 MPa and density 8.28 g/cm$^3$), adjustable thermal expansion coefficient according to the base materials (usually steel or Ni-based alloy), superior spallation resistance for highly stressed parts due to the amorphous structure, no limitation on parts geometry and dimensions, and a significantly lower cost. In order for a material to be effective at resisting corrosion under molten salt environments, it must have the following properties: Strength over time, long-term creep, and corrosion resistance to molten salts. If the materials to which this coating were to be applied to did not have the coating on it, it would experience intergranular type corrosion, which is localized breakdown and dissolution of the metal. Current products available on the market offer only lackluster performance.

Example 2

Figure 4:
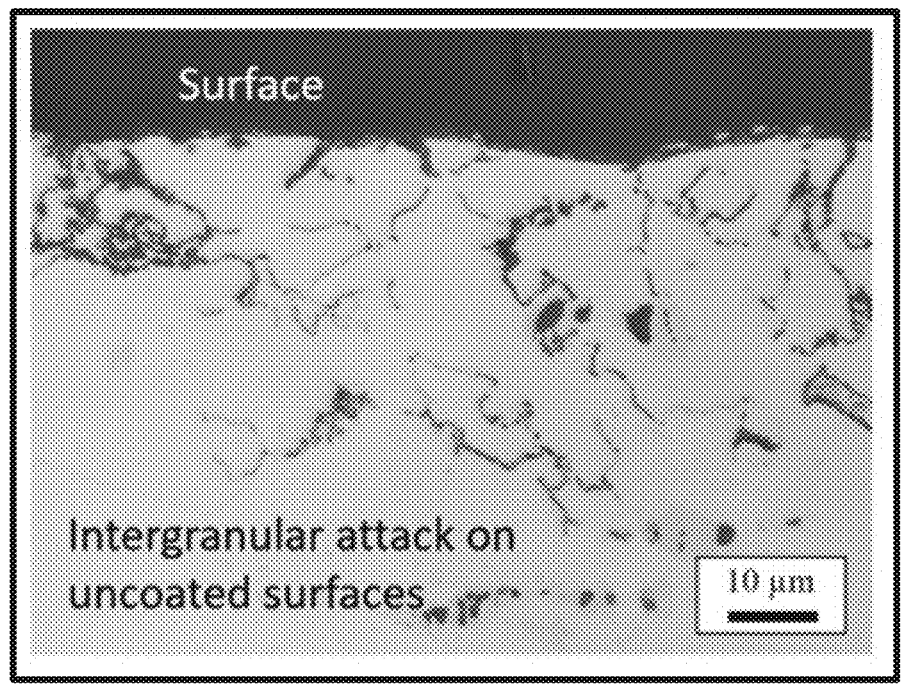
FIG. 4 Cross-section optical micrographs of uncoated Haynes 230 exposed to $KCl-MgCl_2$ for 300 hours at 750° C.
Figure 5:
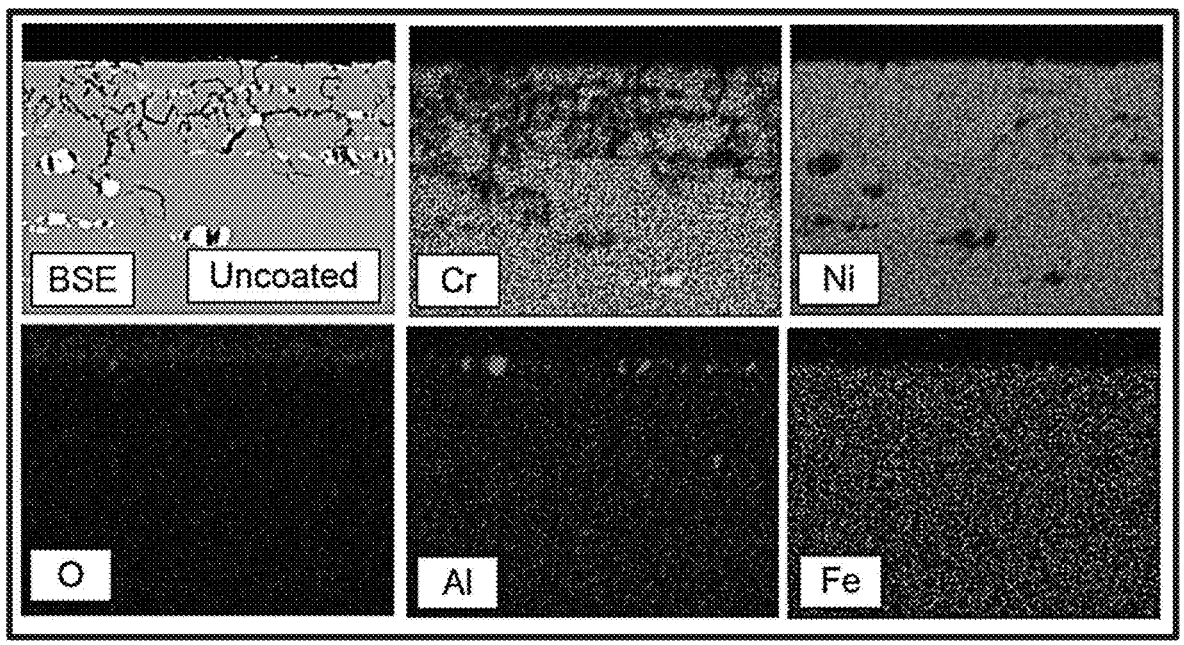
FIG. 5 shows the SEM-EDS mapping of uncoated Haynes 230 exposed to $KCl-MgCl_2$ for 300 hours at 750° C.
Figure 6:
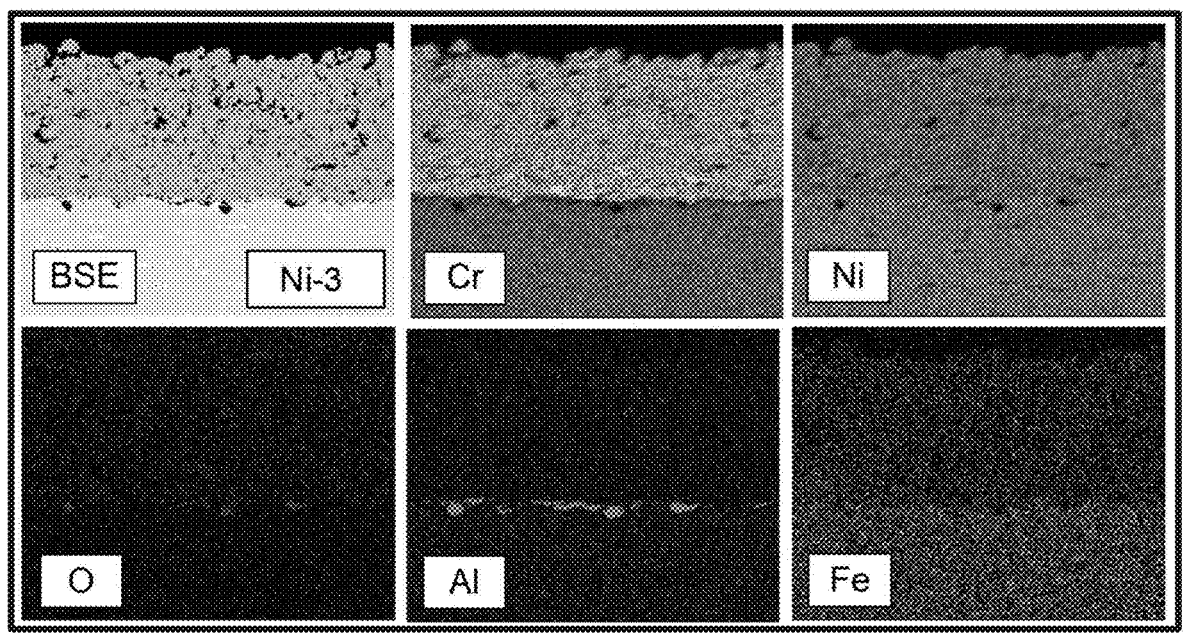
FIG. 6 shows the SEM-EDS mapping of Haynes 230 with Ni-3 coating exposed to $KCl-MgCl_2$ for 300 hours at 750° C.
Figure 7:
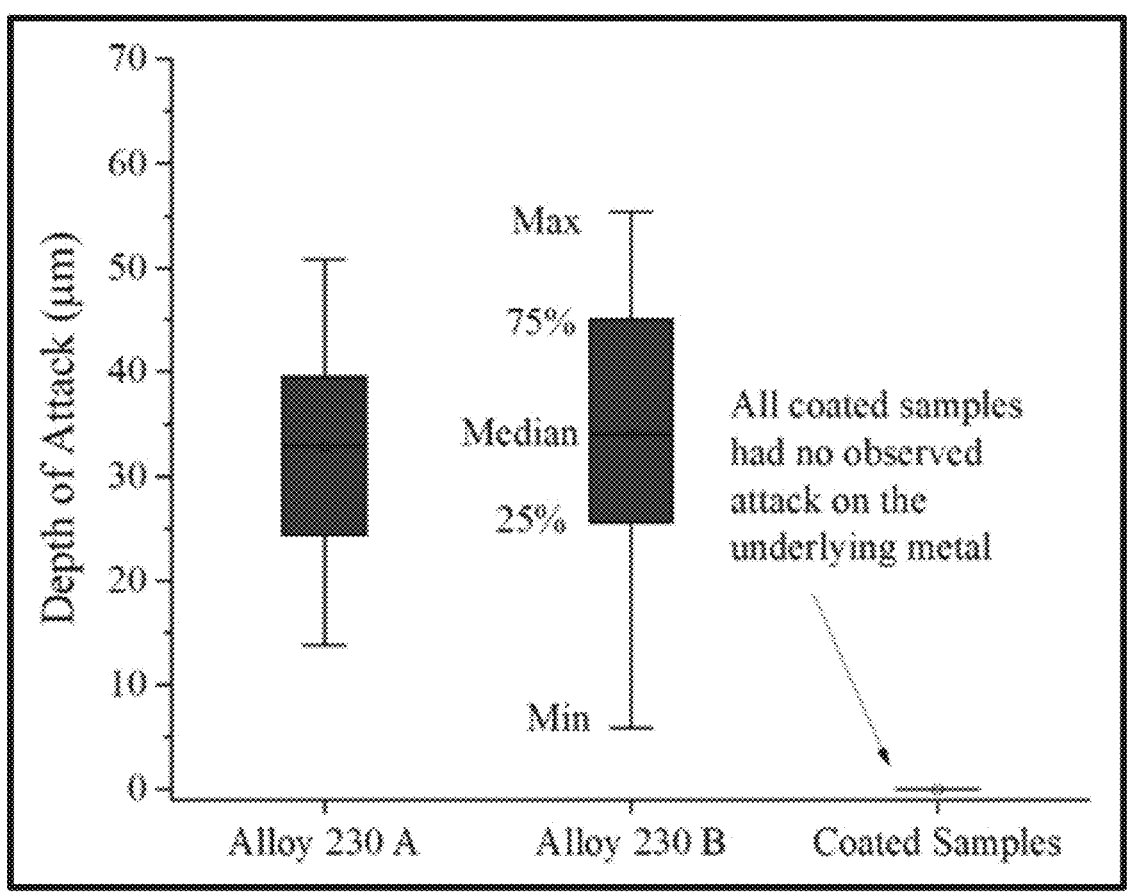
FIG. 7 shows box and whisker plots showing depth of attack on the uncoated samples. The coated samples exhibited no attack on the base metal.

The powder comprising the Ni based amorphous alloy 2 (marked Ni-3) is applied to a substrate by a High Velocity Oxy-Fuel (HVOF) thermal spraying process. Preferably the said powder has a particle size from 10 micrometers to 60 micrometers. The thermal spraying melts the particles, then atomizes them and sprays them onto the substrate at high velocities, quenching on the substrate and providing an amorphous coating. Another layer was applied, using the same process, and bonded with the previous layer. To test the efficacy of the coating in corrosion resistance, samples with dimensions 20×10×2 mm and from Haynes 230 (Alloy 230) were prepared. Three samples each of coated sample were exposed, along with samples of uncoated Haynes 230. Samples were exposed to molten KCl—$MgCl_2$ in a 68/32 ratio for 300 hours at 750° C. Optical micrographs of representative samples before and after exposure are shown in FIG. 3. After the exposure time is finished, the capsules were flipped vertically to allow the salt mixture to drain from the sample surface, and the capsules were cooled in room temperature. The samples were metallographically mounted and polished to examine the cross sections. As expected, the uncoated alloy Haynes 230 specimens exhibited significant intergranular attack. The coated specimens showed no attack on the base alloy Haynes 230 at all. FIG. 4 shows a close-up of the intergranular attack on an uncoated Alloy 230 samples. The cross sections were also examined with SEM and SEM-EDS and the results are shown in FIG. 5-FIG. 6. As expected, the uncoated Alloy 230 samples had significant Cr depletion along grain boundaries near the surfaces. The coated samples not only showed no Cr depletion in the base metal but exhibited no Cr depletion in the coatings either. The depth of attack was measured on all uncoated samples (40 measurements per sample) based on the SEM-EDS analysis and is shown in FIG. 7. The median depth of attack is 33 μm for 300 hours. This material presented in this patent is an amorphous metal-based coating that transforms to a ceramic at temperatures above 600° C. There are many attractive properties resulting from this transformation. Aside from maintaining the corrosion resistance, the properties the ceramic has are: Unique structure with a controlled chemical composition, high corrosion resistance (no corrosion signs after 300 hours testing at 750° C.) and wear characteristics better than Ni-based alloys. In addition, the ceramic material has high strength-to-weight ratio (for example amorphous alloys have a strength-to-weight ratio 1.9× higher than titanium:amorphous alloys with a strength 2,000-3,500 MPa and density 5-7 g/cm$^3$ have a strength-to-weight ratio of 400-500, while titanium alloys have a strength-to-weight ratio is 260 with a strength of 1,250 MPa and density; a strength-to-weight ratio of 3.3× higher than Inconel:Inconel strength 1,250 MPa and density 8.28 g/cm$^3$), adjustable thermal expansion coefficient according to the base materials (usually steel or Ni-based alloy), superior spallation resistance for highly stressed parts due to the amorphous structure, no limitation on parts geometry and dimensions, and a significantly lower cost. In order for a material to be effective at resisting corrosion under molten salt environments, it must have the following properties: strength over time, long-term creep, and corrosion resistance to molten salts. If the materials to which this coating were to be applied to did not have the coating on it, it would experience intergranular type corrosion, which is localized breakdown and dissolution of the metal. Current products available on the market offer only lackluster performance.

Example 3

The powder comprising the Fe based amorphous alloy is applied to a substrate by a High Velocity Oxy-Fuel (HVOF) thermal spraying process. Preferably the said powder has a particle size from 10 micrometers to 60 micrometers. The thermal spraying melts the particles, then atomizes them and sprays them onto the substrate at high velocities, quenching on the substrate and providing an amorphous coating. Another layer was applied, using the same process, and bonded with the previous layer. The Fe-based coatings are fully amorphous up to 650° C. and start to crystallize after it. At 750° C., 87% of the coating was crystallized. The coating still provides the full corrosion resistance that it did when it was amorphous. The crystallinity was estimated by the area ratio of the major peaks of the heat-treated samples to that of the coating in as-sprayed conditions. The cooling rate was too slow to know exactly if the crystallization was a result of the cooling process or if the crystallization started at the peak temperature (750° C. in this case). The samples after corrosion testing were tested by using XRD. The X-ray pattern of the samples after molten salt testing are consistent with the X-ray diffraction results of heat-treated samples in inert atmosphere. However, the peaks intensity on the samples that was immersed in molten salt are different compared to the heat-treated sample under the same temperature. That could be explained either through different cooling rates of the samples or through the different holding time. However, in both cases hard phases of chromium boride, chromium carbide, molybdenum boride and ternary carbide of ferro-molybdenum were identified in a high concentrated chromium phase (Cr0.7Fe0.3) matrix. Same observations were done for the Ni-based coatings. Both of them are also crystallized after molten corrosion testing. This material presented in this patent is an amorphous metal-based coating that transforms to a ceramic at temperatures above 600° C. There are many attractive properties resulting from this transformation. Aside from maintaining the corrosion resistance, the properties the ceramic has are: unique structure with a controlled chemical composition, high corrosion resistance (no corrosion signs after 300 hours testing at 750° C.) and wear characteristics better than Ni-based alloys, (dense coatings without cracks and corrosion resistant chemistry). In addition, the ceramic material has high strength-to-weight ratio (for example amorphous alloys have a strength-to-weight ratio 1.9× higher than titanium:amorphous alloys with a strength 2,000-3,500 MPa and density 5-7 g/cm$^3$ have a strength-to-weight ratio of 400-500, while titanium alloys have a strength-to-weight ratio is 260 with a strength of 1,250 MPa and density; a strength-to-weight ratio of 3.3× higher than Inconel:Inconel strength 1,250 MPa and density 8.28 g/cm$^3$), adjustable thermal expansion coefficient according to the base materials (usually steel or Ni-based alloy), superior spallation resistance for highly stressed parts due to the amorphous structure, no limitation on parts geometry and dimensions, and a significantly lower cost. In order for a material to be effective at resisting corrosion under molten salt environments, it must have the following properties: strength over time, long-term creep, and corrosion resistance to molten salts. If the materials to which this coating were to be applied to did not have the coating on it, it would experience intergranular type corrosion, which is localized breakdown and dissolution of the metal. Current products available on the market offer only lackluster performance.

Example 4

The amorphous metal Ni based alloy 1 is prepared from Cr, Ni, Fe Si, B, and C in powdered form. The amorphous alloy is substantially free of Mo and C where there is less than 5 wt. % of Mo or C.

Example 5

The amorphous Ni based alloy 2 is prepared from the Cr, Ni, Mo, Cu, Co, Fe, B, Si, and C in powdered form. The amorphous alloy is generally free of B, C, and Si, where there is between 0 to 30 wt. % B, C, and Si.

Example 6

The amorphous metal Fe based alloy is prepared from the Fe, Cr, Mo, B, Si and C in powdered form. The amorphous alloy is generally free of B, C, Si, where there is between 0 to 10 wt. % of these elements.

Example 7

The powder comprising the Ni based amorphous alloy 1 is applied to a substrate by a High Velocity Oxy-Fuel (HVOF) thermal spraying process. Preferably the said powder has a particle size from 10 micrometers to 60 micrometers. The thermal spraying melts the particles, then atomizes them and sprays them onto the substrate at high velocities, quenching on the substrate and providing an amorphous coating. Another layer was applied, using the same process, and bonded with the previous layer.

Example 8

The powder comprising the Ni based amorphous alloy 2 is applied to a substrate by a High Velocity Oxy-Fuel (HVOF) thermal spraying process. Preferably the said powder has a particle size from 10 micrometers to 60 micrometers. The thermal spraying melts the particles, then atomizes them and sprays them onto the substrate at high velocities, quenching on the substrate and providing an amorphous coating. Another layer was applied, using the same process, and bonded with the previous layer.

Example 9

A powder Ni based alloy is applied to a substrate by a High Velocity Oxy-Fuel (HVOF) thermal spraying process in the method described in example 3. Another layer was applied, using the same process, and bonded with the previous layer.

Example 10

Molten salts are used as a heat transfer fluid in concentrated solar power systems (CSP). The heat transfer fluid is used in the receiver. The receiver "heats up due to the incoming solar radiation flux and transmits heat to a heat transfer fluid. This fluid is usually water, air, or molten salt. The heat transfer fluid is then used, directly or indirectly, to run a turbine that produces electricity through a generator.

However, molten salts are very corrosive and will damage the pipes that they run through. Therefore, CSP systems need effective, corrosion resistant materials that will prevent their pipes from being damaged.

To test the efficacy of the coating in corrosion resistance, samples with dimensions 20×10×2 mm and from Haynes 230 (Alloy 230) were prepared. Samples each of coated sample with the three different coatings were exposed, along with uncoated Haynes 230 samples. Samples were exposed to molten $KCl$—$MgCl_2$ in a 68/32 ratio for 300 hours at 750° C. Optical micrographs of representative samples before and after exposure are shown in FIG. 3. After the exposure time is finished, the capsules were flipped vertically to allow the salt mixture to drain from the sample surface, and the capsules were cooled in room temperature. The samples were metallographically mounted and polished to examine the cross sections. As expected, the uncoated alloy Haynes 230 specimens exhibited significant intergranular attack. The coated specimens showed no attack on the base alloy Haynes 230 at all. FIG. 4 shows a close-up of the intergranular attack on an uncoated Alloy 230 samples.

The cross sections were also examined with SEM and SEM-EDS and the results are shown in FIG. 5-FIG. 6. EDS maps are not shown for all samples, only one of each coating type, but maps were taken of all samples, and the depicted maps are representative.

As expected, the uncoated Alloy 230 samples had significant Cr depletion along grain boundaries near the surfaces. The coated samples not only showed no Cr depletion in the base metal but exhibited no Cr depletion in the coatings either.

The depth of attack was measured on both uncoated samples (40 measurements per sample) based on the SEM-EDS analysis and is shown in FIG. 7. The median depth of attack is 33 μm for 300 hours.

Example 11

The Fe-based coatings are fully amorphous up to 650° C. and start to crystallize after it. At 750° C., 87% of the coating was crystallized. The coating still provides the full corrosion resistance that it did when it was amorphous. The crystallinity was estimated by the area ratio of the major peaks of the heat-treated samples to that of the coating in as-sprayed conditions.

Example 12

The samples after corrosion testing were tested by using XRD. The X-ray pattern of the samples after molten salt testing are consistent with the X-ray diffraction results of heat-treated samples. However, the peaks intensity on the samples that was immersed in molten salt are different compared to the heat-treated sample under the same temperature. That could be explained either through different cooling rates of the samples or through the different holding time. However, in both cases hard phases of chromium boride, chromium carbide, molybdenum boride and ternary carbide of ferro-molybdenum were identified in a high concentrated chromium phase (Cr0.7Fe0.3) matrix. Same observations were done for the Ni-based coatings.

While the presently disclosed embodiments have been described in detail with reference to particularly preferred embodiments, those skilled in the art will appreciate that various modifications may be made thereto without significantly departing from the spirit and scope of the embodiments.

Accordingly, the foregoing description should not be read as pertaining only to the precise structures described and illustrated in the accompanying drawings, but rather should be read consistent with and as support to the following claims which are to have their fullest and fair scope.

The invention claimed is:

1. A material comprising a composite comprising an amorphous metal ceramic composite comprising an iron-based amorphous metal alloy and a ceramic formed from the iron-based amorphous metal alloy,
    wherein the composite exhibits a higher corrosion resistance than that of a Haynes 230 alloy when immersed in a molten chloride salt comprising KCl and $MgCl_2$ in a ratio of 68/32 for 300 hours at a temperature of 750° C.;
    wherein the iron-based amorphous metal alloy is fully amorphous up to 650° C. and starts to crystallize at a temperature higher than 650° C., and
    the ceramic comprises a boride and a carbide;
    wherein the iron-based amorphous metal alloy comprising $Fe_{100-(a+b+c)}(Cr_aX_bY_c)$; wherein a is about 10 to 50 wt. %; b is between 0 to 30 wt. %, and c is between 0 to 10 wt. %; wherein X and Y are elements, and X is selected from the group consisting of molybdenum, copper, cobalt, aluminum, titanium, tungsten, niobium, silicon, vanadium, and combinations thereof, and Y is selected from the group consisting of boron, carbon, silicon, and combinations thereof.

2. The material of claim 1, wherein the composite exhibits no corrosion when immersed in the molten chloride salt at the temperature of 750° C.

3. The material of claim 1, wherein the composite is formed from the iron-based amorphous metal alloy within 300 hours of exposing the iron-based amorphous metal alloy above 650° C.

4. The material of claim 1, wherein the composite is not fully amorphous or at least partially crystalline.

5. The material of claim 1, wherein the amorphous metal ceramic composite is configured to be a component of a solar concentrator.

6. The material of claim 5, wherein the component comprises a lens or a mirror.

7. The material of claim 1, wherein the composite exhibits substantially no corrosion when immersed in the molten chloride salt for at least 300 hours.

8. The material of claim 1, wherein the composite comprises a coating.

9. The material of claim 1, wherein the iron-based amorphous metal alloy comprising $Fe_{100-(a+b+c)}(Cr_aX_bY_c)$; wherein a is about 10 to 50 wt. %; b is greater than 10 to 30 wt. %, and c is between 0 to 10 wt. %;
    wherein the iron-based amorphous alloy comprises B, C and Si in a range of about 0 to about 10% by weight in total.

10. The material of claim 1, wherein the amorphous metal ceramic composite is in form of particles with a particle size ranging from about 10 μm to about 60 μm.

11. A material comprising a composite comprising an amorphous metal ceramic composite comprising a nickel-based amorphous metal alloy and a ceramic formed from the nickel-based amorphous metal alloy, wherein the composite exhibits a higher corrosion resistance than that of a Haynes 230 alloy when immersed in a molten chloride salt comprising KCl and $MgCl_2$ in a ratio of 68/32 at a temperature of 750° C., wherein the nickel-based amorphous metal alloy is fully amorphous up to 600° C. and starts to crystallize at a temperature higher than 600° C.;

and the ceramic comprises a boride and a carbide.

12. The material of claim 11, wherein the nickel-based amorphous metal alloy comprising $Ni_{100-(a+b+c)}(Cr_aX_bY_c)$;

wherein a is about 10 to 50 wt. %; b is between 0 to 30 wt. %, and c is greater than 0 to 10 wt. %;

wherein X and Y are elements, and X is selected from the group consisting of molybdenum, copper, cobalt, aluminum, titanium, tungsten, niobium, silicon, vanadium, and combinations thereof, and Y is selected from the group consisting of boron, carbon, silicon, and combinations thereof.

13. The material of claim 12, wherein the nickel-based amorphous alloy comprises Mo and C less than 5% by weight in total.

14. The material of claim 12, wherein the nickel-based amorphous alloy comprises B, C and Si in a range of about 0 to about 30% by weight in total.

15. The material of claim 11, wherein the nickel-based amorphous metal alloy is in form of particles with a particle size ranging from about 10 μm to about 60 μm.

16. The material of claim 11, wherein the composite comprises a coating.

17. The material of claim 11, wherein the composite exhibits substantially no corrosion when immersed in the molten chloride salt for at least 300 hours.

18. The material of claim 11, wherein the composite exhibits no corrosion when immersed in the molten chloride salt at the temperature of 750° C.

19. The material of claim 11, wherein the composite is formed from the nickel-based amorphous metal alloy within 300 hours of exposing the amorphous metal alloy above 600° C.

20. The material of claim 11, wherein the amorphous metal ceramic composite is configured to be a component of a solar concentrator.

* * * * *